UNITED STATES PATENT OFFICE.

EDWIN WADEY, OF LOS ANGELES, CALIFORNIA.

BRAKE APPLICABLE TO MOTOR-CARS, OTHER RAILWAY-VEHICLES, AND REVOLVING SHAFTS GENERALLY.

SPECIFICATION forming part of Letters Patent No. 722,930, dated March 17, 1903.

Application filed June 11, 1900. Serial No. 19,976. (No model.)

*To all whom it may concern:*

Be it known that I, EDWIN WADEY, of the city of Los Angeles, in the county of Los Angeles, State of California, have invented certain new and useful Improvements in Brakes Applicable to Motor-Cars, other Railway-Vehicles, and Revolving Shafts Generally, of which the following is a full, clear, and exact description or specification, reference being had to the two annexed sheets of drawings and to the letters marked thereon.

My invention, which relates to improved brakes for retarding or arresting the motion of rotating bodies, has for its object more especially to retard or to arrest the motion of the wheels of railway cars or vehicles when these are running upon the rails of a railway; and my improvement is especially applicable for insuring that all the wheels of a car or vehicle to which the brakes are applied shall be always simultaneously braked, so that irrespective of the state of wear or thickness of the brake-blocks used either upon any wheel or any number of wheels of a railway car or vehicle assurance or certainty is obtained that all the brake-blocks are simultaneously pressed upon the wheels to which they are applied and so that a practically equal brake resistance to the revolving motion of the wheels of a motor car or vehicle is applied to all the wheels so retarded, whereby equality of braking action is assured throughout any number of vehicles or cars composing a train.

In my improved brake mechanism I use a pair of brake-blocks to each wheel whereto braking resistance is to be applied, and I so suspend these brake-blocks from their hangers or suspending-links that the center of pressure of each brake-block and the axis of revolution of the wheels are in a straight line, thereby insuring that the brake-blocks are diametrically opposite each other upon every wheel to which they are applied. I operate these brake-blocks by what I designate as an "equalizing-bar" pivoted under the body of the car or vehicle and which according to the number of the wheels to be braked in any car or vehicle is either coupled to a lever which directly operates one of the brake-blocks of each pair of such brake-blocks on each wheel, or if brake-blocks are applied to both the wheels on each axle or pair of axles then this equalizing-bar is coupled to a cross-bar directly uniting two levers, one such cross-bar for each pair of brake-blocks. When the opposite wheels of an axle of any railway car or vehicle have brakes applied to both the wheels upon any axle and when my improved brake mechanism is used for operating brakes applied to all the wheels or to some of the wheels in a pair of trucks upon which a railway-car or vehicle-body is carried after the manner of swiveling trucks, one at each end of a car or vehicle, then I use an intermediate lever carried in or upon the pivoting center of each truck, so that it can be operated by the equalizing-bar, hereinbefore referred to, and these intermediate bars are coupled either to the levers which directly operate the brake-blocks or to a horizontal beam connecting each pair of these levers when a pair of brake-blocks is applied to both wheels upon an axle. In every case the brake-block opposite the brake-block carried by the lever or levers, hereinbefore referred to, is pressed against the wheel to be braked by means of an extension of these levers and by links or ties connecting the opposite brake-blocks, as hereinafter described with reference to the accompanying drawings.

The essential feature of the pivoted equalizing-bar is that it is provided with carrying-rollers over or upon which a chain is stretched and whose opposite ends are connected to the brake mechanism at each end of the car or vehicle, respectively, as hereinafter described, the arrangement being such that the movability of the chain upon the rollers carried by the equalizing-bar enables precisely the same amount of brake pressure or resistance to be applied to all the wheels whereon brake-blocks operate.

Upon the annexed drawings, Figure 1 is a side elevation, partly in section, of a portion of the base-frame of a railway car or vehicle carried upon four wheels—that is to say, two axles—one pair of wheels and one axle being situated at or toward each end of the car. Fig. 2 is a plan of some of the corresponding parts shown at Fig. 1. Fig. 3 is a side elevation, partly in section, of a portion of the base-frame of a railway car or vehicle carried upon a swiveling or pivoting truck at each end thereof. Fig. 4 is a plan corresponding to Fig. 3. Fig. 5 is a plan, partly in horizontal section, of the swiveling bar, chain, and rollers upon a larger scale. Fig. 6 is a front elevation corresponding to Fig. 5.

In Fig. 1 of the drawings the base or body frame of the car is marked A A A A and the outline of the same is shown by the dotted rectangle A A A A, Fig. 2. Under the frame A A A A the two axles B B are carried in axle-boxes, (not shown in the drawings,) but which are the same as those commonly used in railway passenger-vehicles, and on each axle B B a pair of wheels C C and C' C' is carried, which roll upon the rails of a railway whose upper surface or table is indicated by the line D D in Fig. 1.

Upon the pivot E, at the center of the framing A A A A of the vehicle, the horizontal equalizing-bar F F' is carried, as shown at Figs. 1 and 2. This equalizing-bar consists of two bars F and F', as shown more particularly in the enlarged views, Figs. 3 and 4, and between these bars F and F' there are carried chain-rollers G G'. Another chain-roller G'' may also be carried at the center of the equalizing-bar F F', so as to receive and support the chain H at the center where it is carried between the upper and lower members F F' of the equalizing-bar.

In Figs. 1 and 2 the portions of the drawings indicate that brakes are applied to one of the opposite wheels C C', respectively, of each pair of wheels C C and C' C', and the opposite ends of the chain H H are each connected to one of the links I, whose other end is connected to the upper arm of each lever J J', respectively. Each brake-block K is sustained by a hanger K' from a bracket L, bolted to the framing A, as shown at Fig. 1, by means of bolts passing through the brackets L, the hangers K', and the brake-blocks K. The outside brake-block K of each pair of brake-blocks K K carries the levers J J', respectively, each pivoted on the same pin or bolt M which passes through the rear of the brake-blocks K K and links K' K', while the lower portion or arm of each lever J J' in Fig. 1 are connected by means of the links N N' to the bolts O O', which pass through the inner hangers K' K', and the inner brake-blocks K K, respectively, as shown at Figs. 1 and 2.

The outer ends of the equalizing-bar F F', as shown in Figs. 1, 2, 5, and 6, are coupled by means of the links P P', each to one end of a piece of chain P'' P'', while the other end of each piece of chain P'' P'' is fastened to the lower end of the vertical brake-shaft P''', one at each end of the railway car or vehicle. From this arrangement it follows that by turning either of the brake-shafts P''' by means of the hand-wheel P'''', with which each brake-shaft P''' is provided, either of the chains P'' is wound up upon the lower end of the shaft P''', and by means of this arrangement the equalizing-bar F F' is pulled rotatively upon its pivot E, which equalizing-bar, by means of the chain H H, the links I I, the levers J J', and the connecting-links N N', causes the brake-blocks K K at opposite sides of each wheel C C' to be pressed against the periphery of each wheel, and thereby retard or arrest the motion of the wheels and axles of the railway car or vehicle according to the degree of pressure applied through the brake-levers and equalizing-bar. From the construction of the equalizing-bars F F', with its chain-rollers G, G', and G'' and the chain H H carried thereon, it follows that the chain H H and the rollers G, G', and G'' of the equalizing-bar, also the equalizing-bar F F' itself, all move in relation to each other until the tension upon each end of the chain H H is alike, by which arrangement it is insured that irrespective of any irregularities due either to different conditions of wear of the several brake-blocks K K of the system or due to other causes of irregularity, the equalizing-bar F F' and the chain H H will always so adjust themselves until an equal amount of brake-pressure is applied to the wheels, which are retarded or arrested by the brake mechanism constituting this invention. When it is desired to release the brake-blocks K K from the wheels C C', the hands of the brakeman are withdrawn from the hand-wheels P'''' P'''', and the spiral springs Q Q', one end of each of which is attached to the upper end of each lever J J', respectively, and the other end of each spring Q Q' attached to an eyebolt Q'' Q''', respectively, fastened in the framing A A A A, as shown at Figs. 1 and 2, pull the levers J J' backward, thereby releasing the brake-blocks K K from the wheels C C', and for the purpose of further facilitating the withdrawal of the brake-blocks from the wheels C C' the hangers K' K' are pressed against the upper ends by the springs R R, which force the hangers K' K' outward. The connecting-links N' N' are provided with turnbuckles or long adjustable nuts N'' N''', respectively, which are fitted screwwise to the links N N', and which turnbuckles or long adjusting-nuts by being turned in opposite directions will either lengthen or shorten, and thereby adjust the length of the connecting-links N N, as may from time to time be required.

In Figs. 1 and 2, as aforesaid, the brake apparatus is shown with its parts in the position of the brakes being on on two diagonally opposite wheels C C' and the dotted line U U indicates the central line of the equalizing-bar F F' when the brakes are off from the wheels C C'.

In Figs. 3 and 4, which, as aforesaid, represent my improved brake apparatus or mechanism as applied to each of the wheels of the swiveling trucks, one at each end of a railway car or vehicle, the mechanism is in all respects the same as hereinbefore described with reference to Figs. 1 and 2, and therefore these parts are lettered with the same reference-letters; but as the equalizing-bar and the chain H H are used to operate the brakes upon each of the four wheels of each truck a second equalizing bar or lever V″ V‴, respectively, is applied and pivoted upon the pivots V⁗, whereby each of the trucks W W′ is carried and attached pivotwise at each end of the car or vehicle framing A A A A. The equalizing-bars V″ V‴ are each connected at equally distant points upon opposite sides of the pivots V⁗ V⁗, respectively, by links X X, to the center of the cross-bars S, S, S′, S″, and S‴, respectively, each connecting together the opposite pairs of levers J J and J′ J′ of the brake-blocks applied to each pair of wheels, so that it is obvious that by means of my equalizing-bar and its several attachments and connections the whole of the wheels of a railway car or vehicle carried upon two swiveling trucks may be retarded or arrested when necessary and released when necessary, as hereinbefore described. Furthermore, it is obvious that the carrying of the chain H H upon the rollers G G′ G″ in the equalizing-bar F F′ always enables the same brake-pressure to be maintained upon all of the wheels of the double-swiveling truck car or vehicle, as shown at Figs. 3 and 4, not only when a car is running on a straight line, but also upon a curved piece of railway, for the chain H H will move upon the rollers G G′ G″ to accommodate any swiveling motion of the trucks W W.

Instead of making the equalizing-bar of two portions F and F′, it may be formed as a single bar, with studs projecting from it for carrying the chain-rollers G G′.

Although I have in the preceding parts of this specification described and on the annexed sheets of drawings have shown my improved brake as applied directly to the rolling surfaces of the wheels of cars or vehicles which roll or run upon the rails of railways, I desire it to be understood that in place of applying my brake to the rolling surfaces of these wheels my brake may be applied to operate upon a brake-drum or cylindrical braking-surface either keyed onto the axles by which the wheels are carried or to cylindrical brake-surfaces cast upon or attached to the inner or outer faces or both of the inner or outer faces of the rolling wheels themselves, the particular cylindrical or circular surfaces to which my brake is applied not being any particular or essential feature of my invention.

I desire it to be understood that although I have hereinbefore described and on the annexed drawings have shown my brake as operated by hand-wheels and vertical revolving shafts upon which said hand-wheels are mounted, yet my brake is not necessarily operated by hand-wheels and vertically-revolving shafts, as my brake may be operated by a manually-moved lever, as is well understood, and it may also be operated by compressed air acting upon a piston in a cylinder, as is also well understood, such a compressed-air cylinder for operating my brake being indicated in position as attached to the framing of a railway car or vehicle by the dotted lines marked Y in Figs. 2 and 4.

I desire, further, to observe that while all the parts of my brake as hereinbefore described and shown upon the annexed drawings constitute a complete system when used together, yet certain parts thereof—such, for example, the equalizing-bar and chain with rollers—may be used to operate other arrangements of the brake-blocks. For example, this equalizing-bar, chain, and rollers may be used to operate with brake-blocks which are used upon one side of the wheels only instead of upon both sides of the wheels, as hereinbefore described and shown upon the annexed drawings; but I consider the arrangement I have shown and described and wherein the brake-blocks are applied to both sides of the wheels as by far the most effectual method of applying brakes to the wheels of a railway car or vehicle.

Having now described the nature of my said invention, I desire to observe, in conclusion, that what I consider to be novel and original, and therefore claim as the invention to be secured to me by Letters Patent, is as follows:

1. The brake for retarding or arresting the motion of rotating bodies such as the wheels of railway cars or vehicles consisting of independently-suspended brake-blocks, that is to say, without brake-beams in connection therewith as commonly employed, said brake-blocks being independently suspended in pairs, two for each wheel, the brake-blocks being at diametrically opposite parts of said wheels, a lever moving in a vertical plane operating in connection with one of the brake-blocks of each pair of brake-blocks, said suspended brake-blocks being connected together in pairs, two for each wheel, by adjustable coupling-links extending from the suspension center of one of the brake-blocks to the lower arm of the lever moving in a vertical plane in connection with the other brake-block and operated by tension upon the upper arm of the aforesaid lever or levers according to the number of pairs of brake-blocks employed, in the manner and for the purposes, substantially as hereinbefore described.

2. The brake for retarding or resisting the motion of rotating bodies consisting of the pivotal equalizing-bar, the chain passed over rollers in said equalizing-bar, each end of said chain being coupled to a lever operating each pair of brake-blocks, a brake-block of each pair being at opposite ends of a diameter of each wheel braked, whereby the brake-beams commonly used are dispensed with, said lever, operating in a vertical plane, the arrangement being such that it produces equal brake-pressure upon all the rotating bodies retarded, all in the manner and for the purposes substantially as hereinbefore described.

3. The combination consisting of two swiveling trucks, the independently-suspended brake-blocks on each truck, namely, a pair of suspended brake-blocks for each wheel braked, the pivotal equalizing-bar and chain, the equalizing levers or bars, carried pivotally upon each truck, the links, the levers moving in a vertical plane, the adjustable couplings connecting the suspension center of each pair of brake-blocks to the lower end of the aforesaid lever moving in a vertical plane, and all without the use of brake-beams, in the manner and for the purposes substantially as hereinbefore described.

4. The combination of the pivoted equalizing-bar with its rollers and chain, the levers for operating each pair of brake-blocks moving in a plane at right angles to the shaft whereon the rotating body is carried, the links for suspending the brake-blocks, the springs for drawing off the brake-blocks from the wheels when the brake-pressure is released and the adjustable links connecting each pair of brake-blocks together, substantially as hereinbefore described.

In testimony whereof I have hereunto set my hand, this 20th day of April, in the year of our Lord 1900, in the presence of two subscribing witnesses.

EDWIN WADEY.

Witnesses:
 ST. JOHN DAY,
 A. J. GASFIELD.